(12) United States Patent  (10) Patent No.: US 6,729,262 B2
Ealy et al.  (45) Date of Patent: May 4, 2004

(54) LIVE CAPTURE AUTOMATED MILKING APPARATUS AND METHOD

(75) Inventors: James A. Ealy, Greenback, TN (US); Benjamin L. Carpenter, Knoxville, TN (US); Troy E. Chambers, Lenoir City, TN (US)

(73) Assignee: Innovative Automation, Inc., Greenback, TN (US)

( * ) Notice: Subject to any disclaimer, the term of this patent is extended or adjusted under 35 U.S.C. 154(b) by 0 days.

(21) Appl. No.: 10/264,499

(22) Filed: Oct. 4, 2002

(65) Prior Publication Data

US 2004/0065264 A1 Apr. 8, 2004

(51) Int. Cl.$^7$ ................................................. A01J 5/003
(52) U.S. Cl. ................................................. 119/14.08
(58) Field of Search ........................ 119/14.01, 14.03, 119/14.08, 14.18, 14.48, 670

(56) References Cited

U.S. PATENT DOCUMENTS

| | | | |
|---|---|---|---|
| 4,805,557 A | * | 2/1989 | van der Lely et al. .... 119/14.08 |
| 4,872,147 A | * | 10/1989 | Hilhorst ........................ 367/96 |
| 5,020,477 A | * | 6/1991 | Dessing et al. .......... 119/14.08 |
| 5,553,569 A | | 9/1996 | Street et al. |
| 5,666,904 A | | 9/1997 | Grindal |
| 5,697,326 A | | 12/1997 | Mottram et al. |
| 5,706,758 A | | 1/1998 | Street et al. |
| 5,718,186 A | | 2/1998 | van der Lely |
| 5,762,020 A | | 6/1998 | van der Lely |
| 5,769,025 A | | 6/1998 | van der Lely et al. |
| 5,771,837 A | | 6/1998 | van der Lely |
| 5,778,820 A | | 7/1998 | van der Lely et al. |
| 5,826,536 A | * | 10/1998 | van der Lely et al. .... 119/14.02 |
| 5,857,424 A | | 1/1999 | Johnston |
| 5,931,115 A | | 8/1999 | Lind |
| 5,967,081 A | | 10/1999 | Street et al. |
| 6,118,118 A | * | 9/2000 | van der Lely et al. ...... 250/221 |
| 6,142,098 A | | 11/2000 | van den Berg |
| 6,209,485 B1 | | 4/2001 | van der Lely et al. |
| 6,213,051 B1 | * | 4/2001 | Fransen ................... 119/14.08 |
| 6,234,109 B1 | * | 5/2001 | Andersson et al. ...... 119/14.08 |
| 6,321,688 B1 | | 11/2001 | Eriksson |
| 6,357,387 B1 | | 3/2002 | Johannesson |
| 6,394,028 B1 | | 5/2002 | Birk |
| 6,418,876 B1 | | 7/2002 | Hall et al. |
| 6,532,892 B1 | * | 3/2003 | Nilsson ................... 119/14.03 |

* cited by examiner

*Primary Examiner*—Charles T. Jordan
*Assistant Examiner*—Kimberly S. Smith
(74) *Attorney, Agent, or Firm*—Pitts & Brittian, P.C.

(57) ABSTRACT

A method and apparatus for the automated milking of dairy cattle employing live capture of the teats of a dairy cow without requiring identification of a particular dairy cow or the prior knowledge of the location of the individual teats. The live capture milking apparatus locates the individual teats of a dairy cow and attaches a teatcup to the teat without the need for human intervention. After the milking operation is completed, the live capture milking apparatus returns to a home position where cleaning and sanitization the milking equipment occurs.

3 Claims, 18 Drawing Sheets

LIVE CAPTURE AUTOMATED MILKING APPARATUS AND METHOD

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of Invention

The present invention relates to an apparatus and a method for automated milking of a dairy cow using real-time acquisition of the teat locations. More particularly, the present invention uses a network of sensors to locate the teats and does not require the dairy cow to carry an identifier providing teat position information.

2. Description of the Related Art

The dairy industry operates on low margin, high volume production of milk. Further, adequate labor is not available as the pay scale is minimal compared to other competing jobs, such as factory, fast food, and other service industries. In order to remain competitive, milk producers are constantly striving for ways to increase milk production at lower cost. The current trend is to improve milking efficiency through automation, or robotic milking. Robotic milking offers many advantages over manual milking. First, it drastically reduces labor costs. Second, it allows milk producers to increase herd size due to increased efficiency and regular milking schedules.

Automatic milking systems are known to those skilled in the art. Typical of these automatic milking systems are those disclosed in the following United States Patents:

| U.S. Pat. No. | INVENTOR | ISSUE DATE |
| --- | --- | --- |
| 6,357,387 | Johannesson | Mar. 19, 2002 |
| 6,142,098 | van den Berg | Nov. 7, 2000 |
| 5,967,081 | Street, et al. | Oct. 19, 1999 |
| 5,931,115 | Lind | Aug. 3, 1999 |
| 5,771,837 | van der Lely | Jun. 30, 1998 |
| 5,769,025 | van der Lely, et al. | Jun. 23, 1998 |
| 5,762,020 | van der Lely | Jun. 9, 1998 |
| 5,718,186 | van der Lely | Feb. 17, 1998 |
| 5,706,758 | Street, et al. | Jan. 13, 1998 |

A number of patents disclose improvements to milking systems intended to reduce the collection of dirt and debris within the teatcup. These include U.S. Pat. No. 6,357,387, issued to Johannesson, which describes an automatic milking apparatus wherein the teatcups are stored upside down and U.S. Pat. No. 6,142,098, issued to van den Berg, which describes a flexible teatcup that can be bent to move the opening to a horizontal position.

Other patents disclose systems for automatically milking a cow. U.S. Pat. No. 5,967,081, issued to Street, et al., describes a robot which is capable locating one teat at a time and sequentially attaching the teatcups to the dairy cow. U.S. Pat. No. 5,718,186, issued to van der Lely, describes a robot for a box-type milking system. The robot includes a carrier for automatically attaching teatcups. The robot includes sensors to determine if the teatcups are not properly returned to the carrier.

BRIEF SUMMARY OF THE INVENTION

The present invention is a method and apparatus for the automated milking of dairy cattle employing live capture of the teats of a dairy cow without requiring identification of a particular dairy cow or the prior knowledge of the location of the individual teats. The live capture milking apparatus locates the individual teats of a dairy cow and attaches a teatcup to the teat without the need for human intervention. After the milking operation is completed, the live capture milking apparatus returns to a home position where cleaning and sanitizing of the milking equipment occurs.

The basic structural components move the milking platform from the home position to a position generally under the udder region of a dairy cow. The main positioning arm attaches to the main support via a main elevator and a rotary actuator. The main elevator adjusts the height of the main positioning arm along the longitudinal axis of the main support. The rotary actuator rotates the main positioning arm around the main support. The main positioning arm extends and retracts to position the milking platform along the longitudinal axis of the main positioning arm. The milking platform carries one controlling seeker arm and three secondary seeker arms.

The controlling seeker arm includes an x-axis actuator, a y-axis actuator, and a z-axis actuator, each of which are responsive to the logic controller and work together to move the controlling seeker arm. Each of the x-axis actuator and the y-axis actuator have a corresponding pair of sensors in communication with the logic controller. The sensors identify the location of the teat. A pair of limit switches are associated with each of the x-axis actuator and the y-axis actuator and are in communication with the logic controller. The activation of a limit switch stops movement of the corresponding actuator and generally indicates that the location of the teat was missed during scanning. A teatcup carried by the controlling seeker arm is adapted to attach to a teat of a dairy cow and collect milk. The teatcup is serviced by a flow switch, a vacuum switch, and a pinch valve that are in communication with the logic controller.

Unique to the controlling seeker arm is a distance sensor. The distance sensor communicates with the logic controller. Specifically, the distance sensor measures the distance between the milking platform and the udder. The logic controller monitors the measured distance and moves the milking platform to compensate for movement of the dairy cow in order to keep the milking platform at a fixed distance relative to the udder during teat acquisition and milking. The secondary seeker arms are identical to the controlling seeker arm with the exception that the secondary seeker arms do not have an associated distance sensor.

The milking process begins with the milking platform in the home position. An input signals that the dairy cow is in position and ready to be milked. Starting the milking process moves the milking platform into the milking position under the udder of the dairy cow. Once in position, the position of the teats of the dairy cow are located by moving the seeker arms until the sensors detect the teat position along both the x- and y-axis. As each teat is located, a teat cup is attached. After all four teats have been located and the teat cups attached, the diary cow is milked until a stop condition is reached. When the milking operation is complete, the teat cups are detached. The milking platform is moved to a wash position. A wash cycle cleans and sanitizes the milking platform for use with the next diary cow. Finally, the milking platform returns to the home position, which may or may not be the same as the wash position.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

The present invention is a method and apparatus for the automated milking of dairy cattle employing live capture of the teats of a dairy cow without requiring identification of a particular dairy cow or the prior knowledge of the location of the individual teats. The live capture milking apparatus is illustrated generally at 10 in the accompanying figures. The live capture milking apparatus 10 positions itself, locates the individual teats of a dairy cow, and attaches a teatcup to the teat without the need for human intervention. After the milking operation is completed, the live capture milking apparatus 10 returns to a home position where cleaning and sanitizing of the milking equipment occurs.

Figure 1:
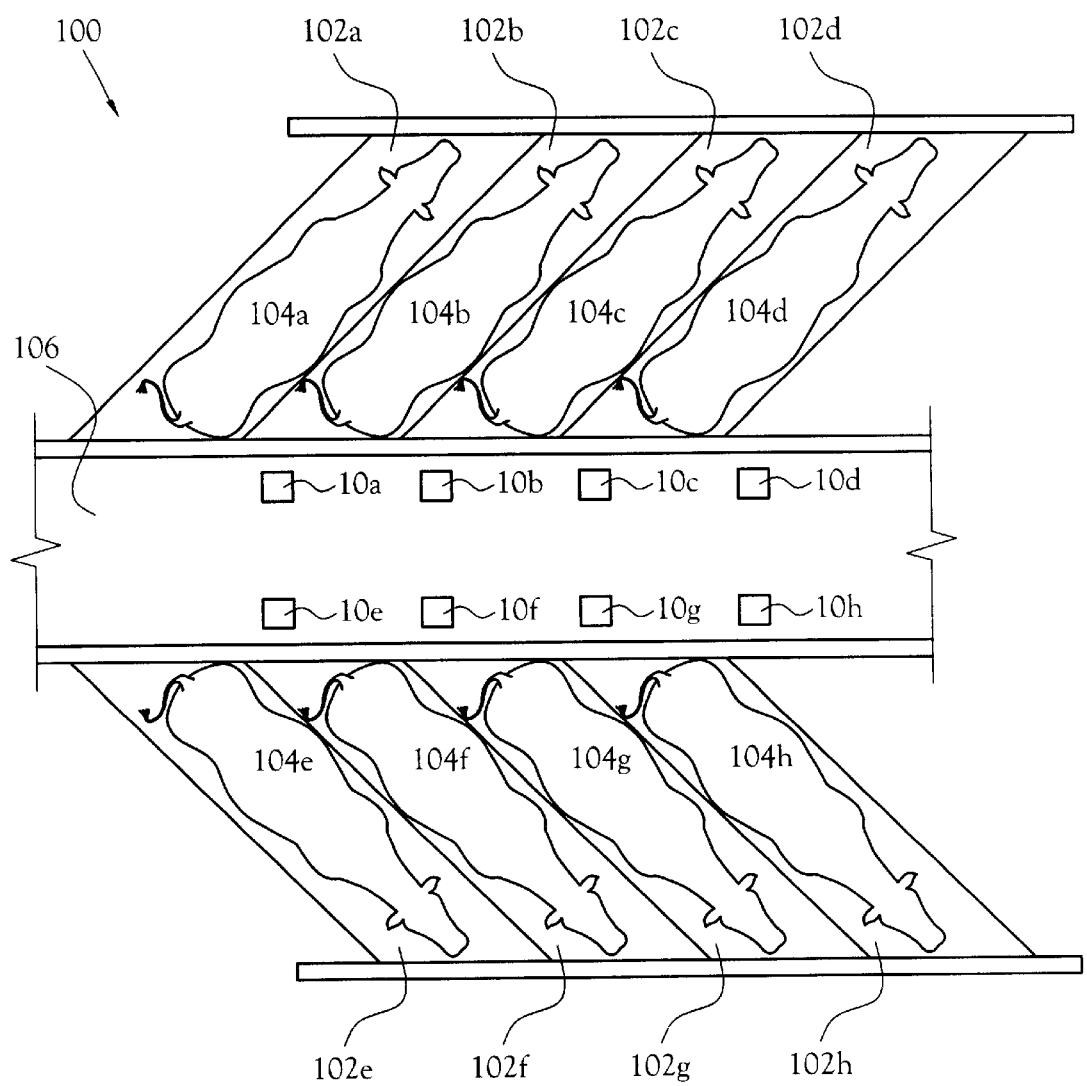
FIG. 1 is a top plan view of dairy cows in a herringbone milking arrangement.

FIG. 1 illustrates a milking parlor 100 adapted to employ a herringbone arrangement. The herringbone arrangement utilizes a simple stall system 102 that orients each dairy cow 104a–h at an angle with respect to the operator pit 106. Typically, this angle is between thirty and forty-five degrees. This allows the dairy cows 104a–h to be side-milked, which provides easy access to the udders and allows the use of an arm-type takeoff. A herringbone arrangement requires approximately 45 inches per stall 102a–h. Each stall 102a–h is equipped with a live capture milking apparatus 10a–h. Those skilled in the art will recognize that the live capture milking apparatus 10 of the present invention can be utilized with other milking parlor arrangements, including tandem (side-milking), parallel (rear-milking), and rotary (side- or rear-milking) arrangements.

Figure 2:
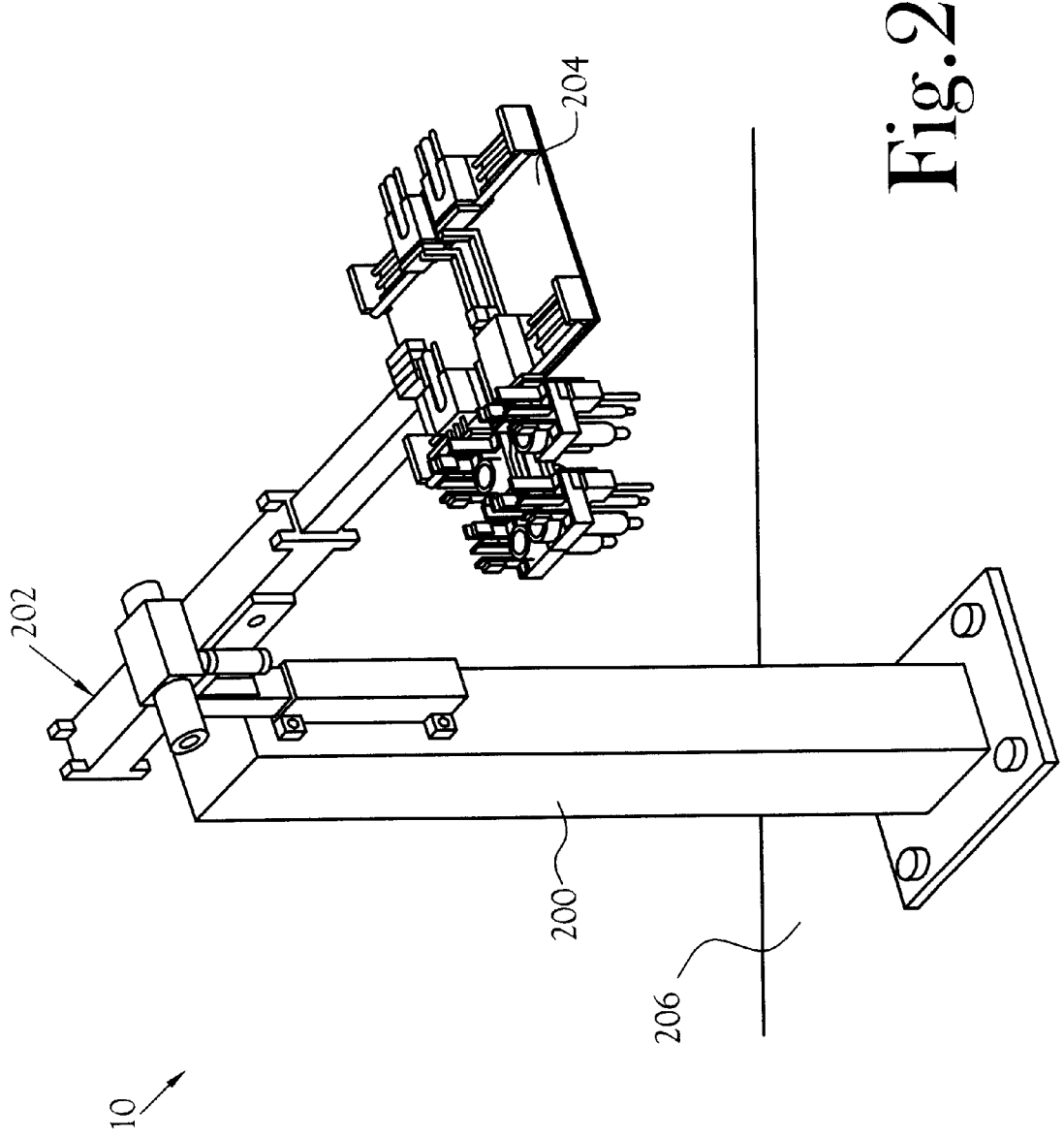
FIG. 2 is a perspective view of the live capture automated milking apparatus of the present invention.
Figure 3:
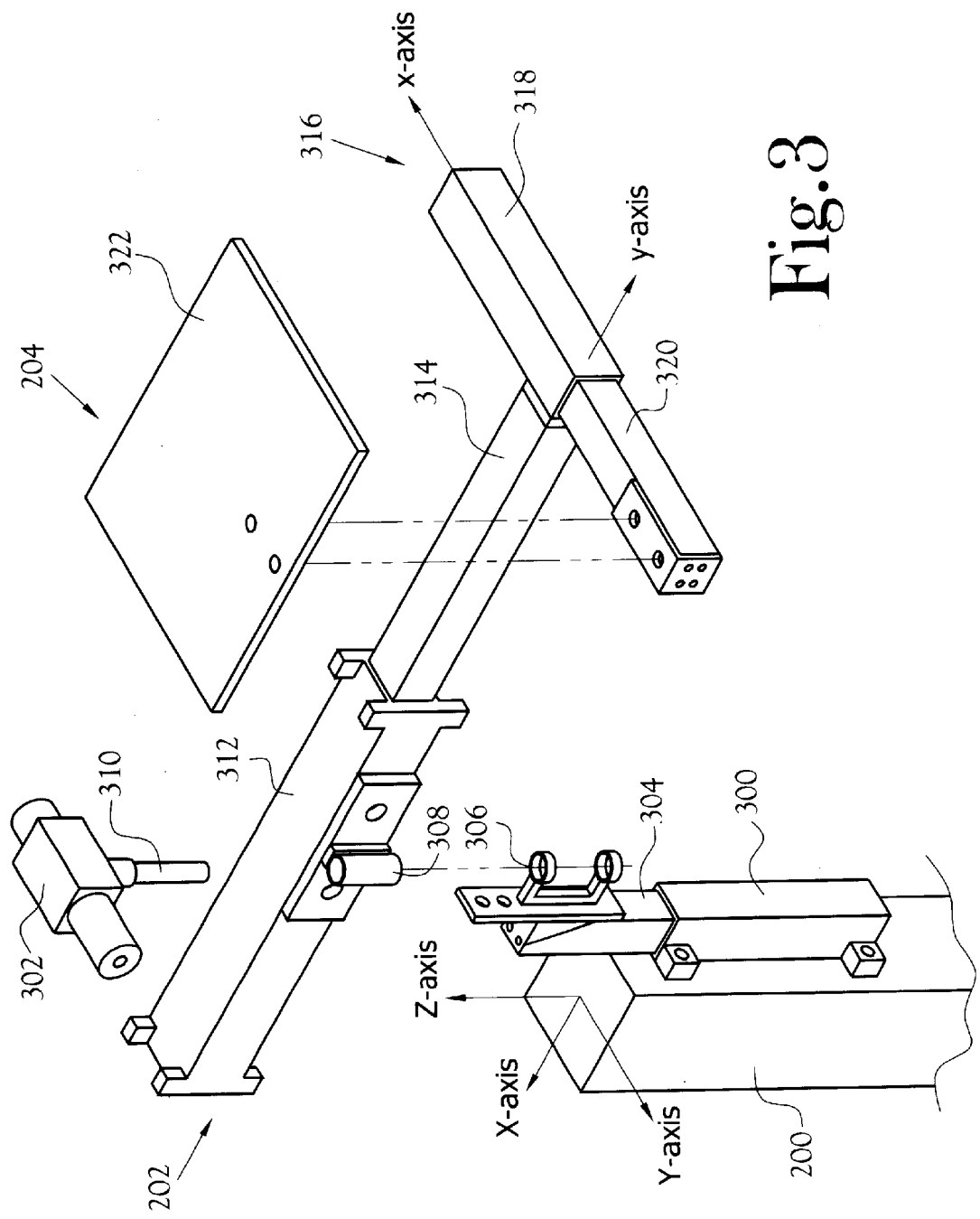
FIG. 3 is an exploded perspective view of the milking platform positioning arms used to position the milking platform generally under the udder region of the dairy cow.

FIG. 2 is a perspective view of the live capture milking apparatus 10 of the present invention. The basic structural components of the live capture milking apparatus 10 include a main support 200, main positioning arm 202, and a milking platform 204. The main support 200 is secured to a fixed object, such at the floor 206. The main support 200 has a height based upon the relative heights of the milking parlor floor and the pit floor. FIG. 3 shows the interconnection of the basic structural components in greater detail.

FIG. 3 is an exploded perspective view of the basic structural components of the live capture milking apparatus 10. The basic structural components move the milking platform 204 from the home position to a position generally under the udder region of a dairy cow. The main positioning arm 202 attaches to the main support 200 via a main elevator 300 and a rotary actuator 302. The main elevator 300 adjusts the height of the main positioning arm 202 along the longitudinal axis, i.e., the major Z-axis, of the main support 200. The rotary actuator 302 rotates the main positioning arm 202 around the main support 200, i.e., adjusts the angle, θ, between an orthogonal projection from the main support 200 and the main positioning arm 202. The main positioning arm 202 extends and retracts to position the milking platform 204 along the longitudinal axis, i.e., the major Y-axis, of the main positioning arm 202.

The main elevator 300 includes a pneumatic cylinder capable of lifting the main positioning arm 202 to a height proximate to the bottom of the udder. The main elevator 300 is carried by the main support 200. Further, the main elevator 300 has a longitudinal axis that is parallel to the longitudinal axis of the main support 200. The pneumatic cylinder drives a lift arm 304 that is raised and lowered to achieve the desired height. A bracket 306 attached to the lift arm cooperates with a corresponding bracket 308 on the main positioning arm 202 to form a hinge-like connection point. The rotary actuator 302 includes a hinge pin 310 that is received by the main support bracket 306 and the main positioning arm bracket 308 to complete the hinge.

A pneumatic cylinder 312 adjusts the length of the main positioning arm 202 by driving a main extensor arm 314. A secondary positioning arm 316 is orthogonally secured to the end of the main extensor arm 314 distal from the main positioning arm pneumatic cylinder 312. A pneumatic cylinder 318 adjusts the length of the secondary positioning arm 316 along the longitudinal axis, i.e., the major X-axis, of the secondary positioning arm 316 by driving a secondary extensor arm 320. A base plate 322, which supports the entire milking platform 204, is secured to the end of the secondary extensor arm 320 distal from the secondary positioning arm pneumatic cylinder 318. The main positioning arm 202 and the secondary positioning arm 316 cooperate to position the milking platform 204 in the major X-Y plane. Collectively the main positioning arm 202, the main elevator 300, the rotary actuator 302, and the secondary positioning arm 316 are referred to as the major motion components.

In the illustrated embodiment, the main elevator 300, the main positioning arm 202, and the secondary positioning arm 316 employ a fluid powered linear slide, such as the Pneumoment® actuator offered by Bimba® Manufacturing Company for the linear motion along the respective axes. The rotary actuator 302 is a fluid powered rotary actuator, such as the Pneu-Turn® rotary actuator offered by Bimba® Manufacturing Company. Pneumatic devices have been found to offer the desired precision, accuracy, repeatability, and reliability necessary to properly move and position the milking platform. Further, pneumatic devices have the added advantage of being resistant to moisture by design. This feature makes them ideally suited for use in a device requiring frequent washing. However, those skilled in the art will recognize that other movement mechanisms can be substituted for the pneumatic devices without a loss of precision, accuracy, repeatability, and reliability, such as electric motors or hydraulics. The use of electric motors would merely require the addition of a moisture resistant housing, which is within the competency of a skilled artisan aware of the need for moisture resistance.

The linear slide for the main elevator 300 has a stroke of approximately sixteen inches. The linear slide for the main positioning arm 202 has a stroke of approximately twenty-three inches. The linear slide for the secondary positioning arm 316 has stroke of approximately twelve inches. The rotary actuator 302 is capable of approximately seventy degrees of rotation. Those skilled in the art will recognize that the stroke lengths and rotation limits described herein have been selected to provide the desired range of motion for one embodiment of the live capture milking apparatus 10. However, the stroke lengths can be widely varied to accommodate a differing design of the live capture milking apparatus or a differing arrangement or design of the milking parlor.

Figure 4:
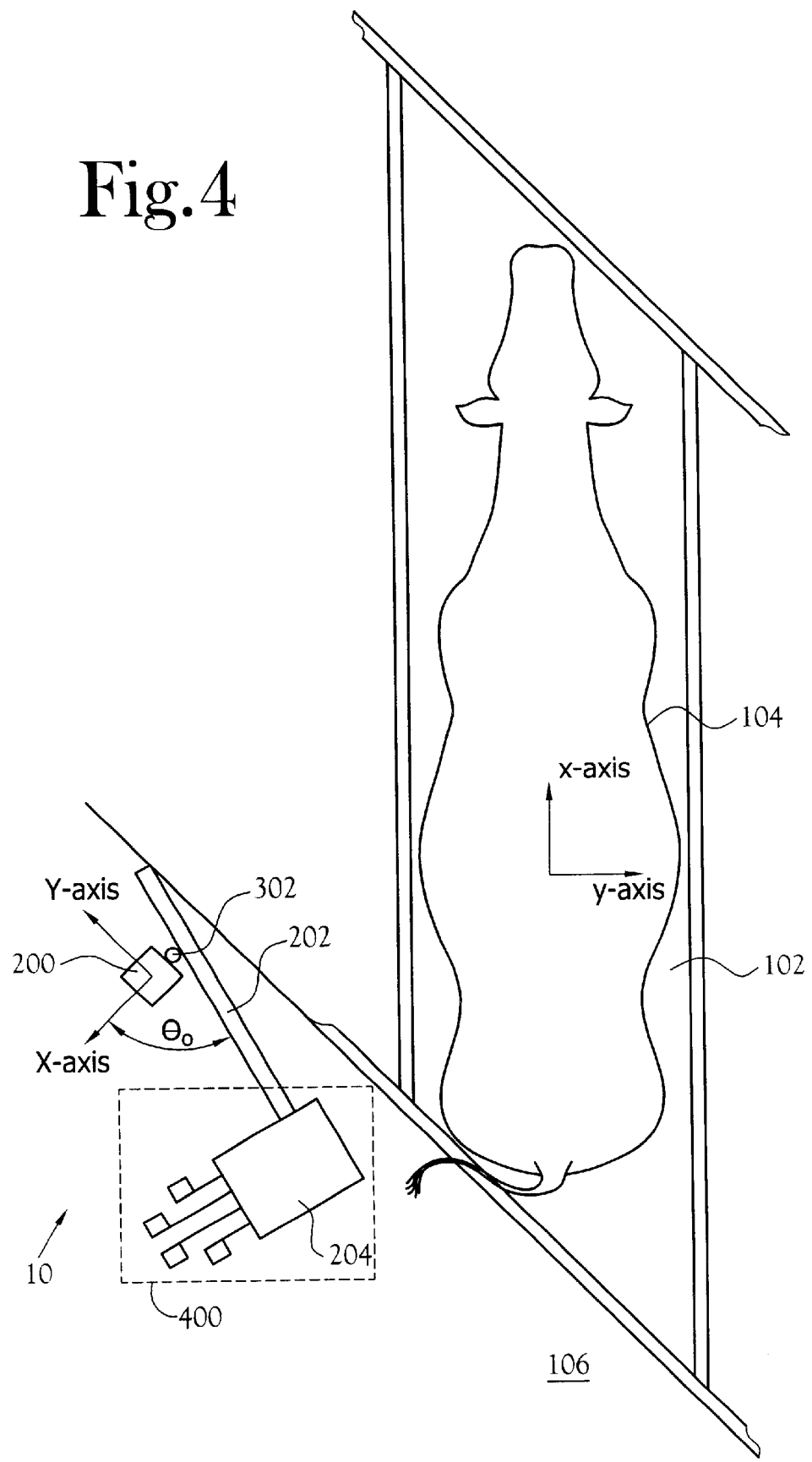
FIG. 4 is a overhead pictorial representation showing the live capture automated milking apparatus in the home position relative to a dairy cow in a herringbone milking parlor.

FIG. 4 illustrates one station in a herringbone arrangement milking parlor. The live capture milking apparatus 10 is located in the pit 106. The dairy cow 104 is positioned in stall 102, which is located on a floor above the pit 106. In the illustrated embodiment, the live capture milking apparatus 10 is shown with the milking platform 204 located in the home position 400. While in the home position 400, the main positioning arm 202 is at angle $\theta_O$ with respect to the X-axis.

Figure 5:
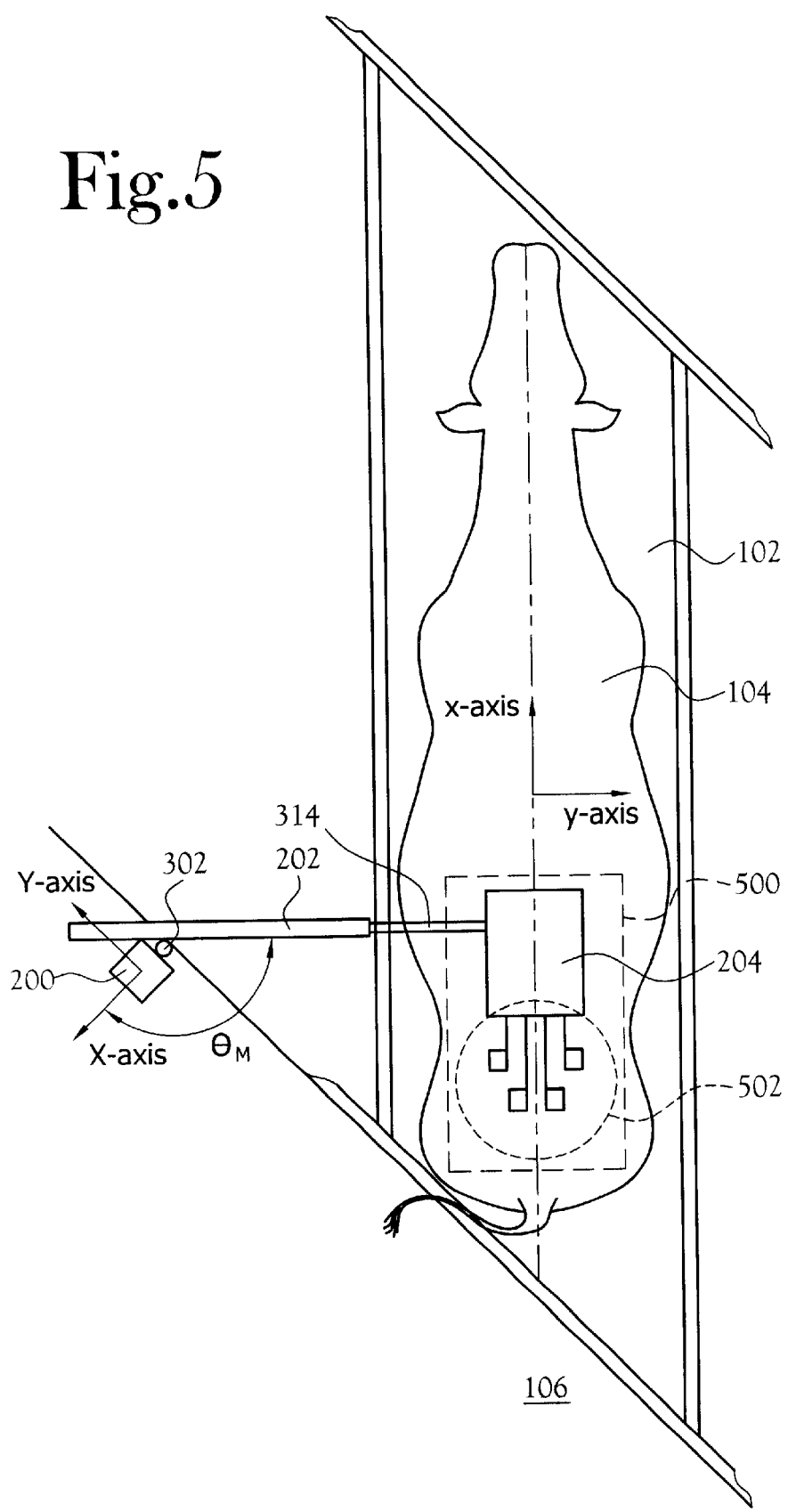
FIG. 5 is a overhead pictorial representation showing the live capture automated milking apparatus in the milking position relative to a daily cow in a herringbone milking parlor.

FIG. 5 illustrates the station of FIG. 4 with the milking platform 204 moved to the milking position 500. The milking position 500 places the milking platform 204 generally proximate to the udder region 502 of the dairy cow 104. While in the milking position 500, the main positioning arm 202 is at angle $\theta_M$ with respect to the orthogonal projection from main support 200. When at angle $\theta_M$, the major coordinate system corresponds with the coordinate system defined relative to the dairy cow 104, in which the X-axis runs substantially parallel to the spine of the dairy cow 104, i.e., head-to-tail, and the Y-axis is orthogonal to the spine, i.e., side-to-side. Adjusting the length of the main positioning arm 202 and the secondary positioning arm 316 with respect to the major X-Y coordinate axes fine tunes the position of the milking platform 204 relative to the udder region.

Figure 6:
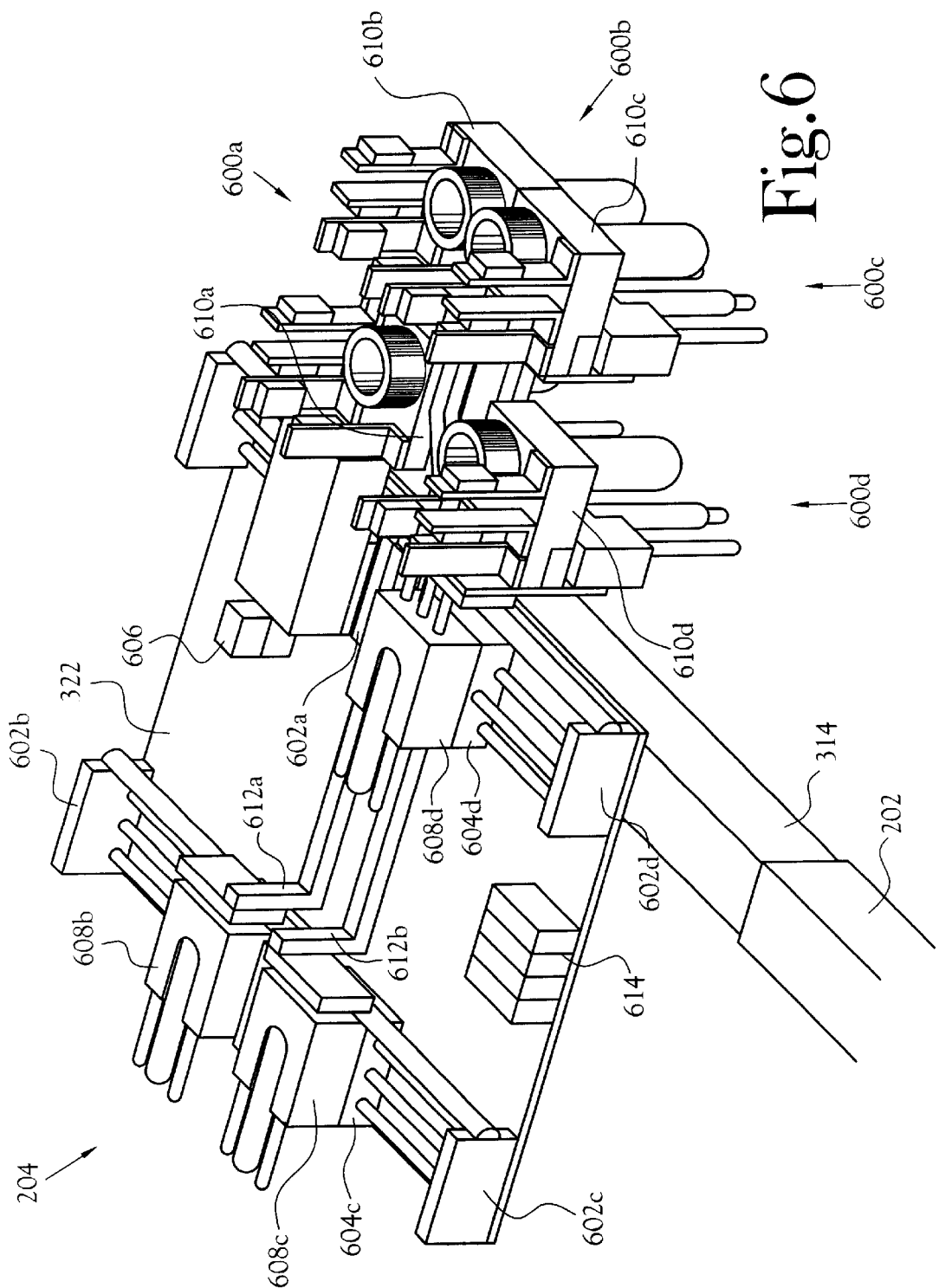
FIG. 6 is a perspective view showing the milking platform with the milking platform positioning arms resting in the home position.

FIG. 6 illustrates a perspective view of the milking platform 204. The milking platform 204 carries four seeker arms 600a–d that locate the teats of the dairy cow 104. A minor coordinate system is defined relative to the milking platform 204 and is referred to using lowercase letters. Again, when the milking platform is in the milking position 500, the minor coordinate system corresponds with the coordinate system defined relative to the dairy cow 104. One of the seeker arms 600a is designated as the controlling seeker arm 600a and is assigned special functions associated with maintaining the position of the milking platform 204 relative to the udder. The remaining seeker arms 600b–d are referred to as the secondary seeker arms.

In the illustrated embodiment, the base plate 322 carries four lateral positioners including four track members 602a–d. Each track member 602a–d lies on a line parallel to the minor x-axis and extends across the width of the base plate 322. Each seeker arm 600a–d has an associated carriage 604a–d that moves along the corresponding track member 602a–d to adjust the position of the seeker arm 600a–d along the y-axis. The front teat seeker arms 600a, 600d move along the front track members 602a, 602d. The rear teat seeker arms 600b, 600c move along the rear track members 602b, 602c. Each seeker arm 600a–d includes a teatcup platform 610a–d. Also visible is a bank of pneumatic relays 614 used to control fluid pressure to the pneumatic actuators.

The controlling seeker arm 600a is attached directly to the carriage 604a. There is no mechanism provided for moving the teatcup platform 610a–d of the controlling seeker arm 600a along the minor x-axis. The controlling seeker arm 600a includes a distance sensor 606 adapted to measure a distance to the reference teat. Using information from the distance sensor 606, the milking platform 204 is held at a predetermined distance relative to the reference teat. In the illustrated embodiment, the controlling seeker arm is the front, right seeker arm. Further, the distance sensor 606 is an ultrasonic sensor. Those skilled in the art will recognize that other types of distance sensors, such as a laser distance sensor, can be used without departing from the scope and spirit of the present invention.

Figure 7:
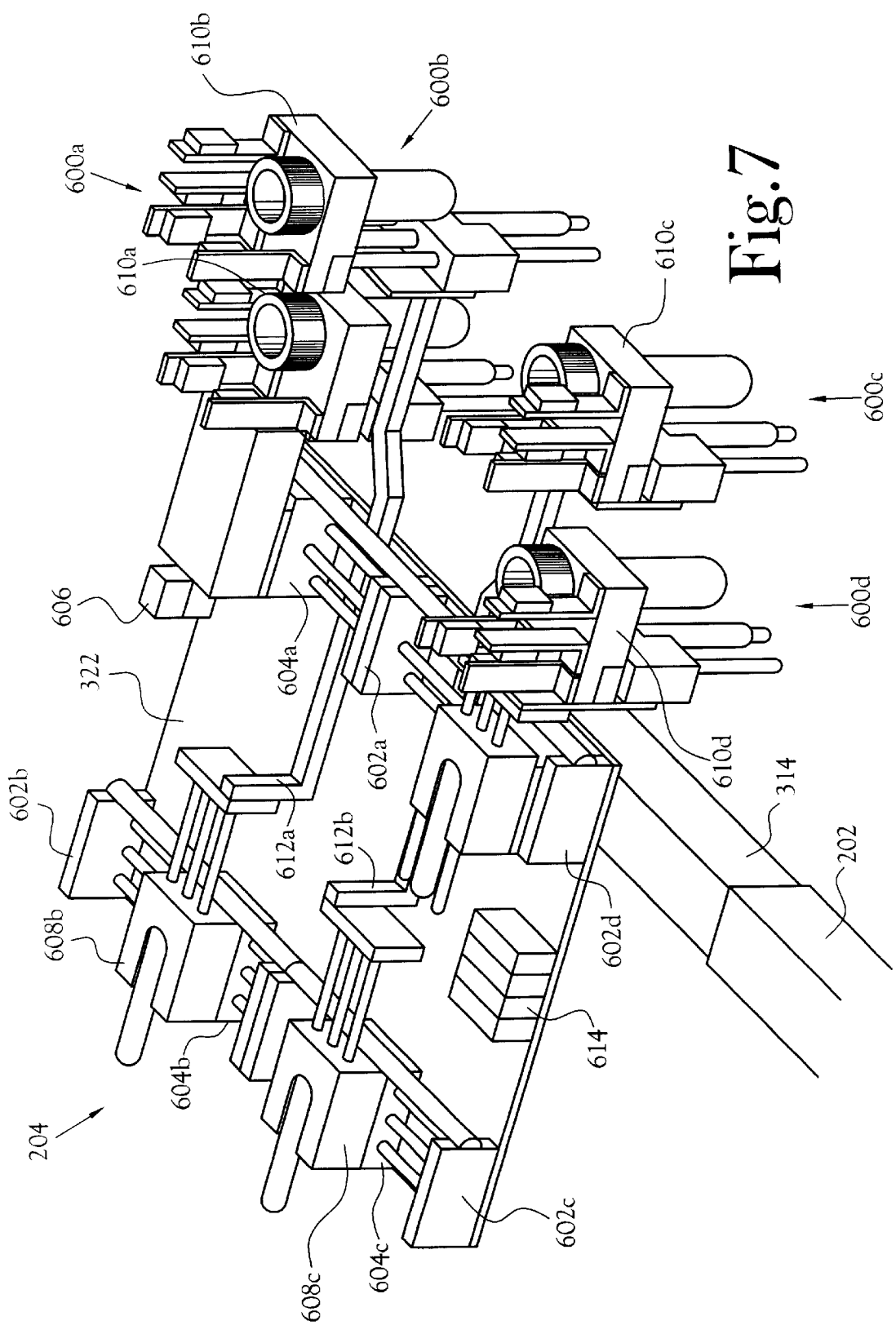
FIG. 7 is a perspective view showing the milking platform with the seeker arms moved to the extents of the range of movement.

Each carriage 604b–d of the secondary seeker arms 600b–d carries a longitudinal positioner 608b–d adapted to extend and retract the secondary seeker arms 600b–d along the x-axis. Depending upon the location of the longitudinal positioner 608b–d, the teatcup platform is either directly attached to the longitudinal positioner 608b–d via a mounting bracket or coupled to the longitudinal positioner 608b–d using an extension 612a–b. FIG. 7 illustrates a perspective view of the milking platform 204 with each seeker arm 600a–d extended to the respective limit of motion within the x-y plane and one teatcup platform 610b is raised to the position for attaching a teatcup to a teat.

In the illustrated embodiment, the carriages 604a–d and the track members 602a–d are part of a fluid powered rodless cylinder such as the Ultran® slide offered by Bimba® Manufacturing Company. The longitudinal positioners 608b–d are linear thrusters such as those offered by Bimba® Manufacturing Company. Again, for the reasons previously mentioned, pneumatic devices are used. Those skilled in the art will recognize that other movement mechanisms can be substituted for the pneumatic devices without a loss of precision, accuracy, repeatability, and reliability.

Figure 8:
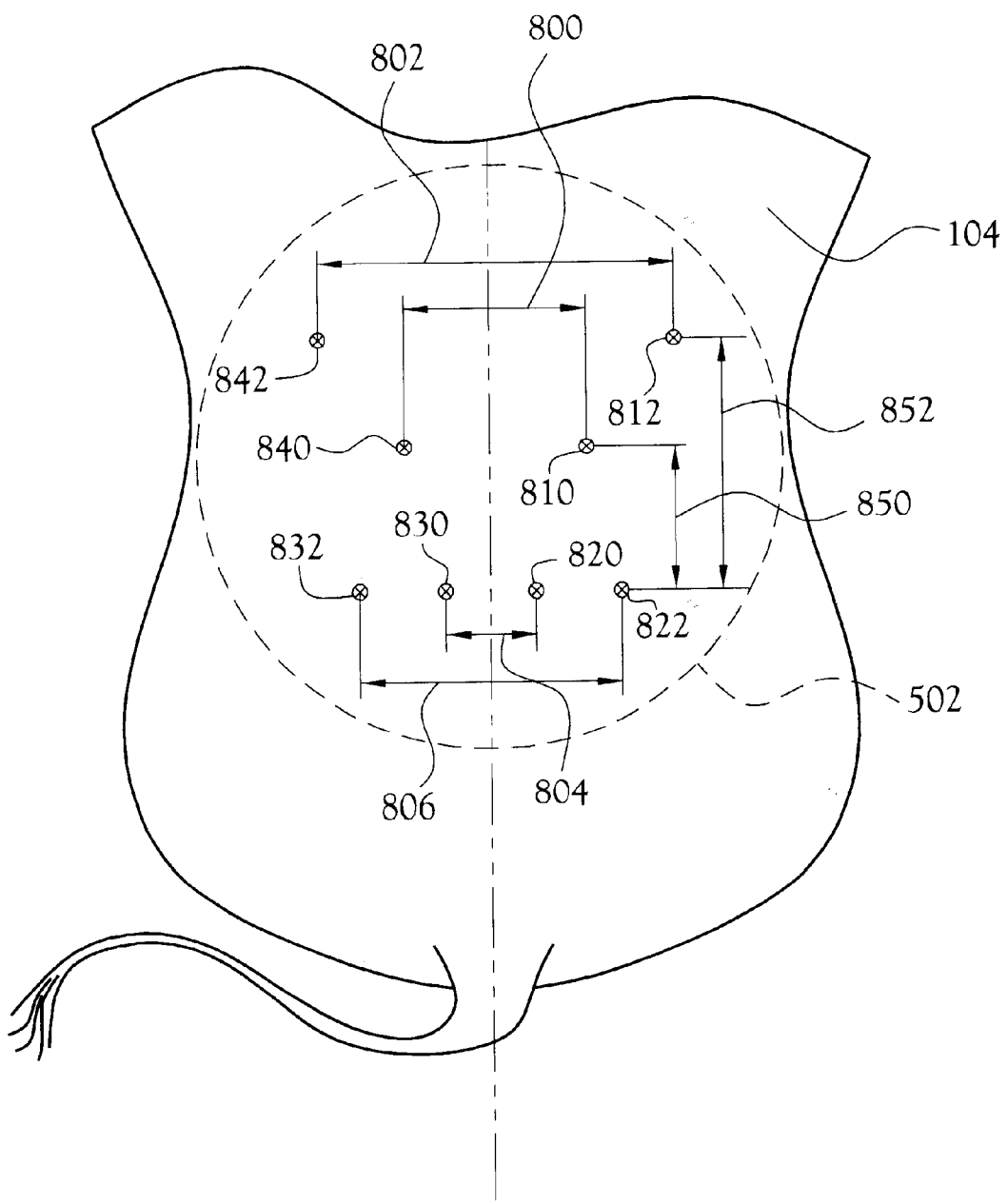
FIG. 8 illustrates the orientation and the maximum and minimum teatcup locations.

FIG. 8 illustrates the orientation and the maximum and minimum teatcup locations. Distance 800 represents the minimum lateral separation between the front teatcups 810, 840. Distance 802 represents the maximum lateral separation between the front teatcups 812, 842. Distance 804 represents the minimum lateral separation between the rear teatcups 820, 830. Distance 806 represents the maximum lateral separation between the rear teatcups 822, 832. Distance 850 represents the minimum longitudinal separation between the front teatcups 810, 840 and the rear teatcups 820, 830. Distance 852 represents the maximum longitudinal separation between the front teatcups 812, 842 and the rear teatcups 822, 832. In the illustrated embodiment, distance 800 is approximately five inches, distance 802 is approximately ten inches, distance 804 is approximately two and one-half inches, and distance 806 is approximately seven and one-half inches. Similarly, distance 850 is approximately four inches and distance 852 is approximately seven inches. Those skilled in the art will recognize that the dimensions described in FIG. 8 are exemplary for one embodiment and are intended to describe a set of dimensions for a typical cow milking operation encompassing most udders. The dimensions can be varied without departing from the scope and spirit of the present invention.

Figure 9:
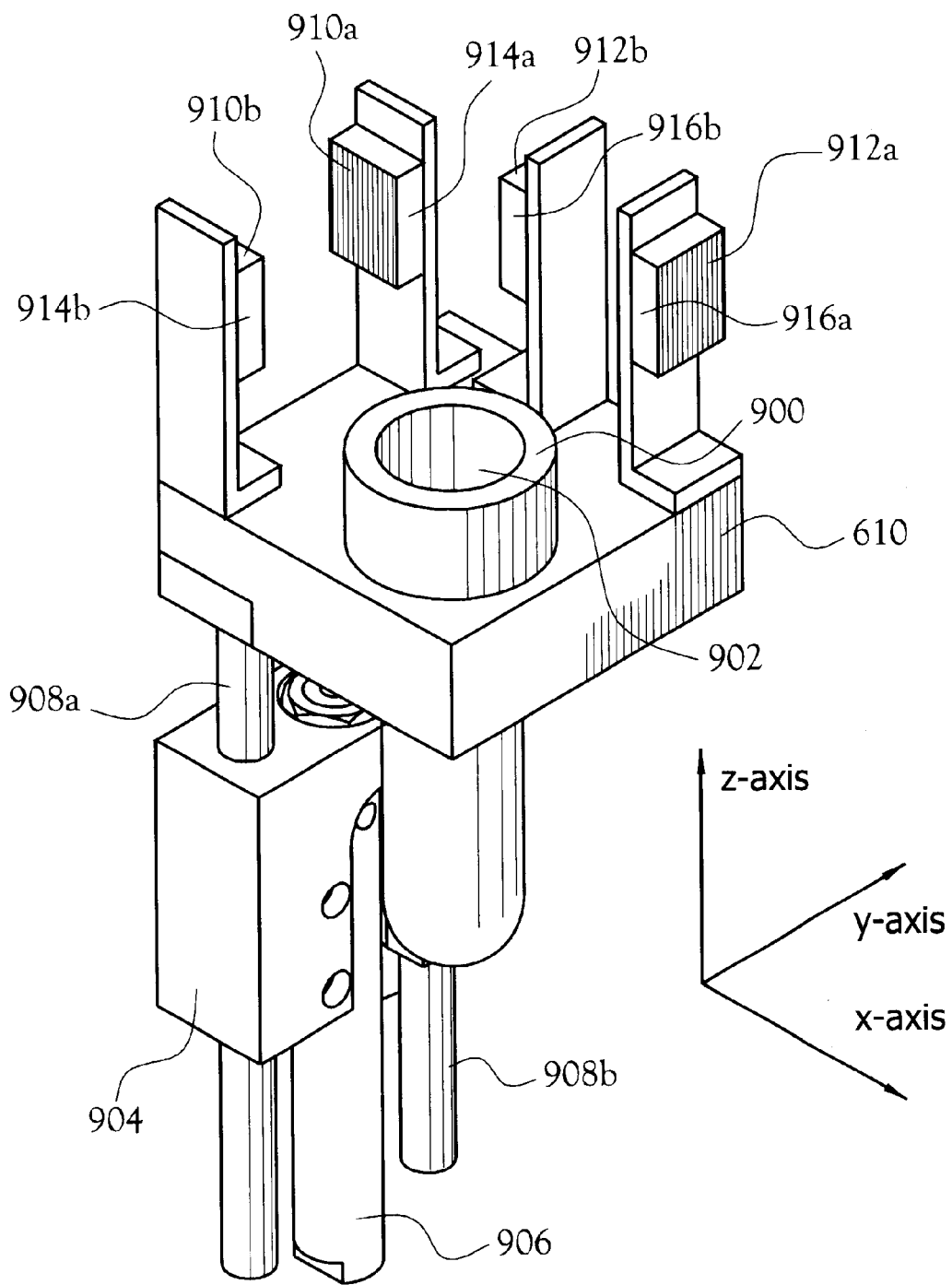
FIG. 9 is a perspective view of a teatcup platform from a seeker arm of the present invention.

FIG. 9 illustrates one embodiment of the teatcup platform 610 associated with each seeker arm 600a–d. The teatcup platform 610 carries a teatcup 900 defining an opening 902. A teatcup elevator 904 is provided to raise and lower the teatcup platform 610 along the z-axis. The teatcup elevator includes a drive rod 906 and two guide shafts 908a, 908b. The drive rod 906 provides the force that moves the teatcup platform 610 and the guide shafts 908a, 908b maintain the stability and provide for smooth, even movement of the teatcup platform 610.

In the illustrated embodiment, the teatcup elevator 904 is a linear thruster such as is offered by Bimba® Manufacturing Company. Again, for the reasons previously mentioned, pneumatic devices are used. Those skilled in the art will recognize that other movement mechanisms can be substituted for the pneumatic devices without a loss of precision, accuracy, repeatability, and reliability.

Mounted on the teatcup platform 610 are two pairs of sensors 910a–b, 912a–b. A first pair of sensors 910a–b is adapted to locate the position of a teat on the y-axis. A second pair of sensors 912a–b is adapted to locate the position of a teat on the x-axis. With reference to the y-axis sensor pair 910a–b, the operation of the sensors is generally explained. Each sensor 910a–b is mounted such that the sensitive surface 914a–b, 916a–b has a forward field of vision overlooking the opening 902 of the teatcup 900. The sensor pair 910a–b is arranged such that, as the teatcup platform 610 is moved along the y-axis, the teat interrupts the field of vision of the first sensor 910a. As the teatcup platform 610 continues to move, the teat interrupts the field of vision of the second sensor 910b at which time the teatcup platform 610 reverses directions. The teatcup platform 610 is centered on the teat when the teat is located between the sensor pair 910a–b. Those skilled in the art will recognize that order of the sensor/teat interaction is dependent upon the direction of movement of the teatcup platform.

Those skilled in the art will recognize that various types of sensors including, but not limited to, visible, infrared, laser, machine vision, and ultrasonic sensors, can be used without departing from the scope and spirit of the present invention. Each sensor type offers advantages and disadvantages. For example, visible spectrum sensors are relatively immune from adjacent sensor emissions while ultrasonic sensors are relatively immune from dirt or manure.

In the illustrated embodiment, the arrangement and operation of each sensor pair 910a–b, 912a–b is substantially similar with the exception that the y-axis sensor pair 910a–b is orthogonal to the x-axis sensor pair 912a–b.

For clarity of illustration of the critical components of the live capture milking apparatus 10, the pneumatic lines, vacuum lines, and electrical wiring have been omitted from the figures. Those skilled in the art will recognize the proper interconnection required to implement the invention described herein without undue experimentation.

Figure 10:
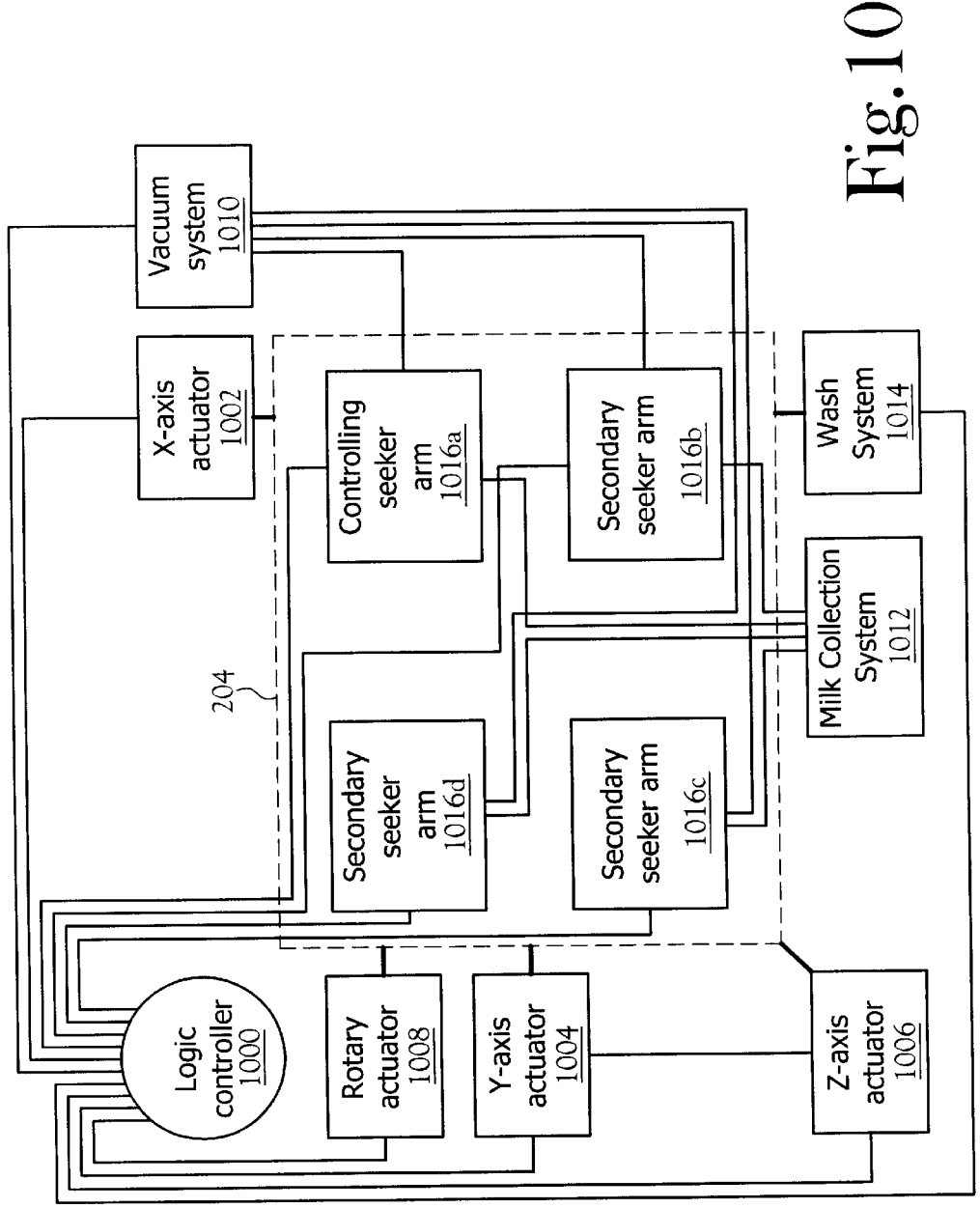
FIG. 10 is pictorial block diagram representing one embodiment of the live capture milking apparatus of the present invention.

FIG. 10 is a block diagram of the live capture milking apparatus 10 at the major motion level. A logic controller 1000 provides logic and control for the operation of the live capture milking apparatus 10. The logic controller 1000 is capable of handling multiple operations either by running multiple programs simultaneous or by interrupt-driven subroutines. In the illustrated embodiment, the logic controller is a programmable logic controller. The X-axis actuator 1002, the Y-axis actuator 1004, the Z-axis actuator 1006, and the rotary actuator 1008 are each connected to and controlled by the logic controller 1000. Auxiliary systems not related to the movement of the milking platform 204 are also controlled by the logic controller 1000. The auxiliary systems include the vacuum system 1010, the milk collection system 1012, and the wash system 1014. The controlling seeker arm 1016a and the secondary seeker arms 1016b–d are connected to and controlled by the logic controller 1000. Each seeker arm 1016a–d is also connected to the vacuum system 1010 and the milk collection system 1012.

Generally, the logic controller 1000 drives the rotary actuator 1008 to move the milking platform 204 from a home/wash position to proximate the side of the dairy cow 104. The logic controller drives the Y-axis actuator 1004 to position the milking platform 204 at the approximate midpoint of a line running from side-to-side of the dairy cow 104. The logic controller drives the Z-axis actuator 1006 to raise the milking platform 204 to a level proximate the udder of the dairy cow 104. The logic controller drives the X-axis actuator 1002 to move the milking platform 204 longitudinally to a position proximate the udder of the dairy cow 104.

Figure 11:
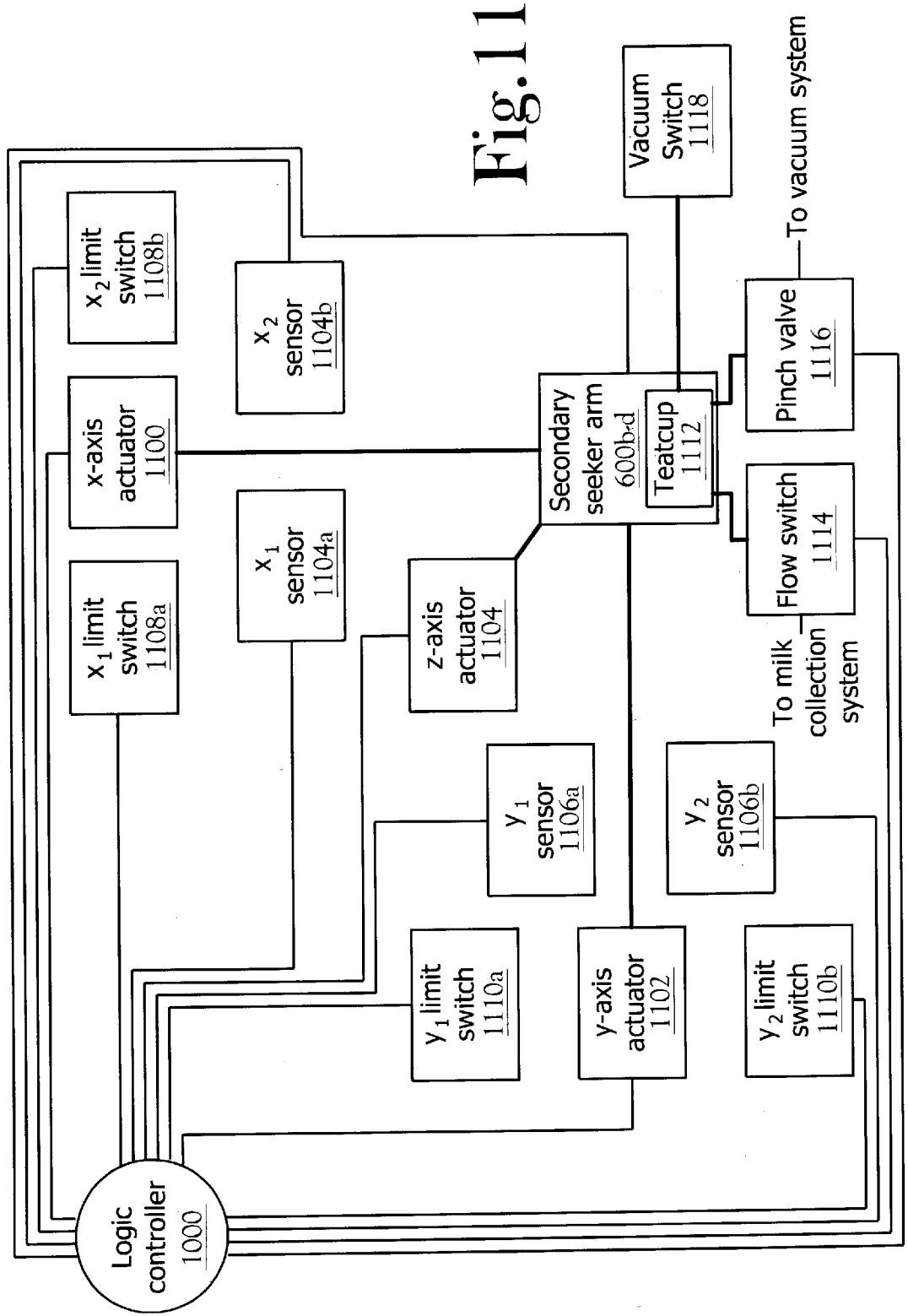
FIG. 11 is pictorial block diagram representing one embodiment of a secondary seeker arm of the of the present invention.

FIG. 11 is a block diagram of a secondary seeker arm 600b–d of the live capture milking apparatus 10. An x-axis actuator 1100, a y-axis actuator 1102, and a z-axis actuator 1104, in communication with the logic controller 1000, are responsible for movement of the controlling seeker arm 600a. Each of the x-axis actuator 1100 and the y-axis actuator 1102 have a corresponding pair of sensors, 1104a–b, 1106a–b, in communication with the logic controller 1000. The lateral and longitudinal sensors 1104a–b, 1106a–b are selected to identify the location of the teat through detection in one of many known spectrums, such as visible light, infrared, ultrasonic, or a laser. A pair of limit switches 1108a–b, 1110a–b are associated with each of the x-axis actuator 1100 and the y-axis actuator 1102 and are in communication with the logic controller 1000. The activation of a limit switch 1108a–b, 1110a–b stops movement of the corresponding actuator 1100, 1102 and generally indicates that the location of the teat was missed during scanning. In the illustrated embodiment, the limit switches 1108a–b, 1110a–b are magnetic reed switches. Those skilled in the art will recognize other types of switches that can be used to implement the limit function without departing from the scope and spirit of the present invention. A milk collection unit, such as a teatcup, 1112 is serviced by a flow switch 1114, a pinch valve 1116, and a vacuum switch 1118. The flow switch 1114, the pinch valve 1116, and the vacuum switch 1118 are in communication with the logic controller 1000. The flow switch 1114 determines whether the quadrant of the udder has been emptied by monitoring the flow of milk being drawn from the teat. The pinch valve 1116 and the vacuum switch 1118 are opened and closed by the logic controller 1000 to toggle the suction action of the vacuum system 1010, to secure the teatcup 1112 on the teat after location, and to release the teatcup 1112 from the teat after the udder quadrant has been emptied.

Figure 12:
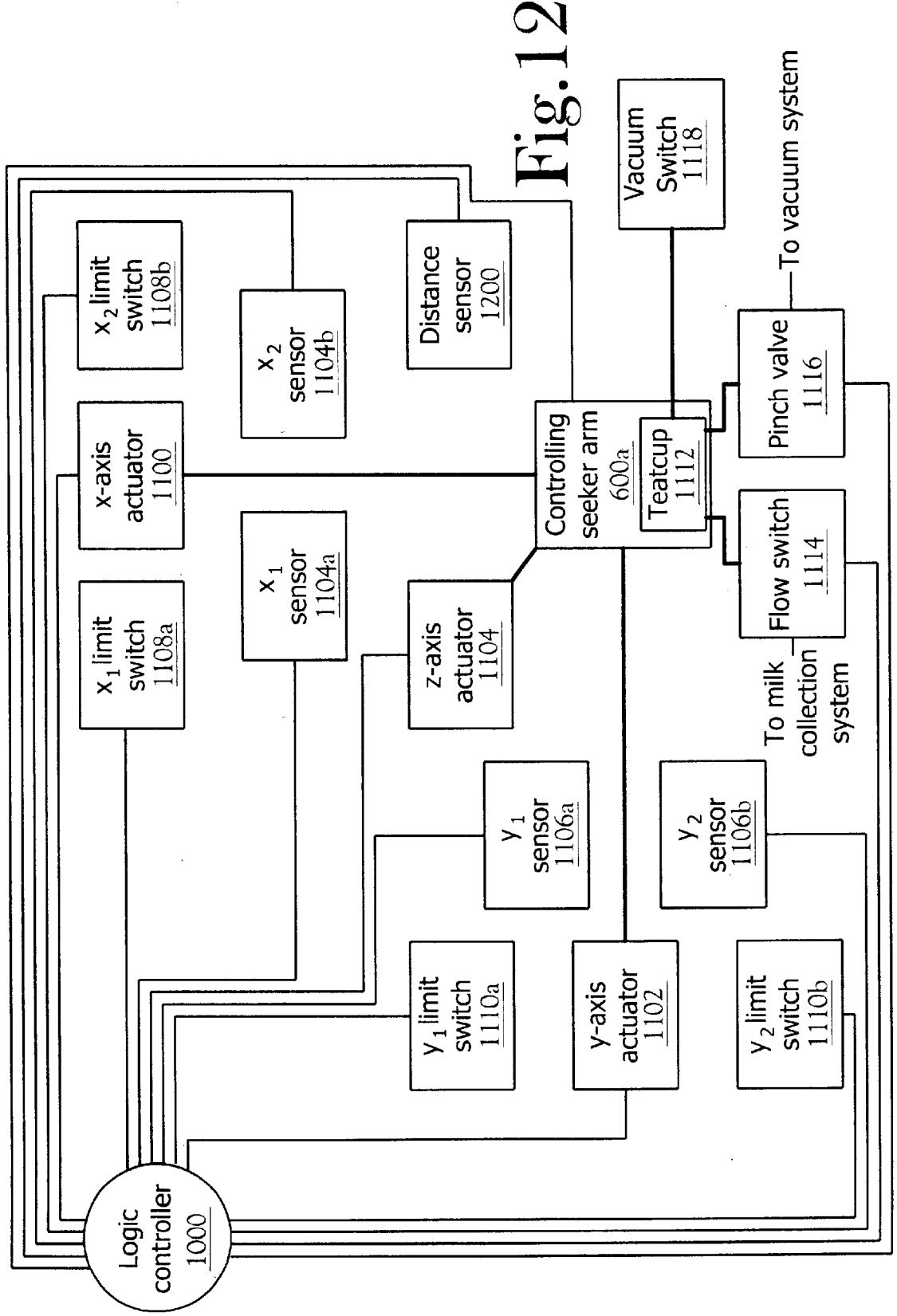
FIG. 12 is pictorial block diagram representing one embodiment of a controlling seeker arm of the of the present invention.

FIG. 12 is a block diagram of the controlling seeker arm 600*a* of the live capture milking apparatus 10. The secondary seeker arms 600*b–d* are identical to the controlling seeker arm 600*a* with the exception that the secondary seeker arms 600*b–d* do not have an associated distance sensor 1200.

Unique to the controlling seeker arm 600*a* is the distance sensor 1200. The distance sensor 1200 communicates with the logic controller 1000. Specifically, the distance sensor measures the distance between the milking platform 204 and the udder. The logic controller 1000 monitors the measured distance and moves the milking platform 204 to compensate for movement of the dairy cow 104 in order to keep the milking platform 204 at a fixed distance relative to the udder during teat acquisition and milking.

While the embodiment described herein utilizes a dedicated programmable logic controller to provide logic and control functions, those skilled in the art will recognize other types of logic controllers that can be used without departing from the scope and spirit of the present invention. For example, the logic and control functions can be implemented using a microprocessor, a programmable interrupt controller, an application specific integrated controller, a microcontroller, or constructed from discrete logic components. Further, those skilled in the art will understand that the logic and control functions can be controlled from a general purpose computer running logic and control software adapted for use with the live capture milking apparatus 10.

The electrical components used in the live capture milking apparatus 10 conform generally to the following specifications. Those skilled in the art will recognize that these specifications are intended only as guidelines reflecting one embodiment and can be adapted depending upon the desired characteristics of the live capture milking apparatus. Such modifications are deemed to be within the purview of one skilled in the art and would not require undue experimentation. The sensors, solenoid valves, and the programmable logic controller of the present invention operate from a twenty-four volt direct-current power. The enclosure for the electronics is NEMA 4, UL approved. The vacuum switches are constructed of USDA approved materials, such as stainless steel. The limit switches are typically of the magnetic reed type.

Figure 13:
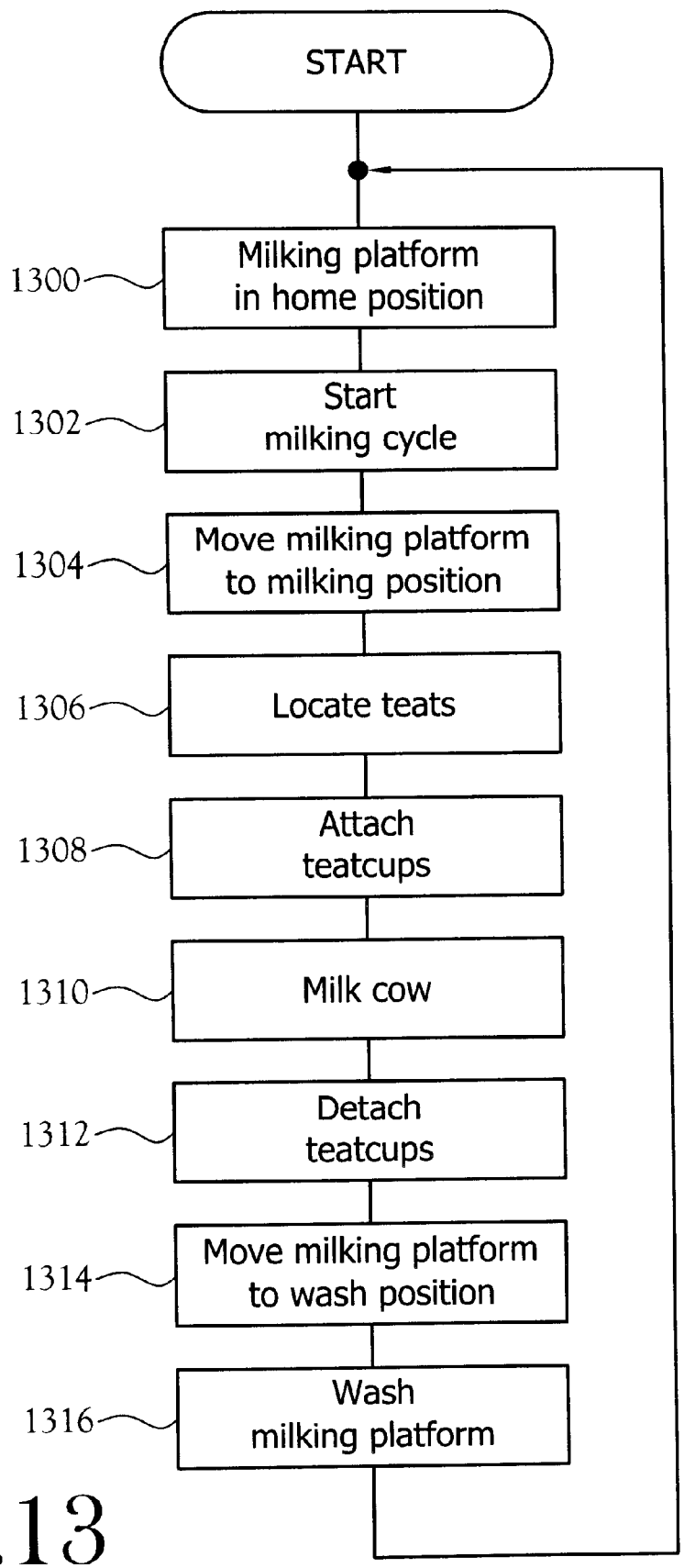
FIG. 13 is a flow diagram of the live capture method for securing the teatcups on the teats of a dairy cow.

FIG. 13 is a flow diagram of the basic functions of the live capture milking apparatus 10 of the present invention. The milking process begins with the milking platform 204 in the home position 400, shown in block 1300. An input signals that the dairy cow 104 is in position and ready to be milked, shown in block 1302. The input signal is generated from any of a number of sources including, but not limited to, a manually generated trigger activated by an employee, or a switch or a sensor activated by an event, such as a switch located in the stall 102 that is activated when the stall gate is closed. Those skilled in the art will recognize various mechanisms for triggering the start of the milking process, which do not depart from the scope and spirit of the present invention.

Starting the milking process moves the milking platform 204 into the milking position 500 under the udder of the dairy cow 104, shown in block 1304. Once in position, the position of the teats of the dairy cow 104 are located, shown in block 1306. As each teat is located, a teat cup is attached, shown in block 1308. After all four teats have been located and the teat cups attached, the diary cow is milked until a stop condition is reached, shown in block 1310. When the milking operation is complete, the teat cups are detached, shown in block 1312. The milking platform 204 is moved to a wash position, shown in block 1314. A wash cycle cleans and sanitizes the milking platform 204 for use with the next diary cow 104, shown in block 1316. Finally, the milking platform returns to the home position 400, which may or may not be the same as the wash position, returning again to block 1300.

Figure 14:
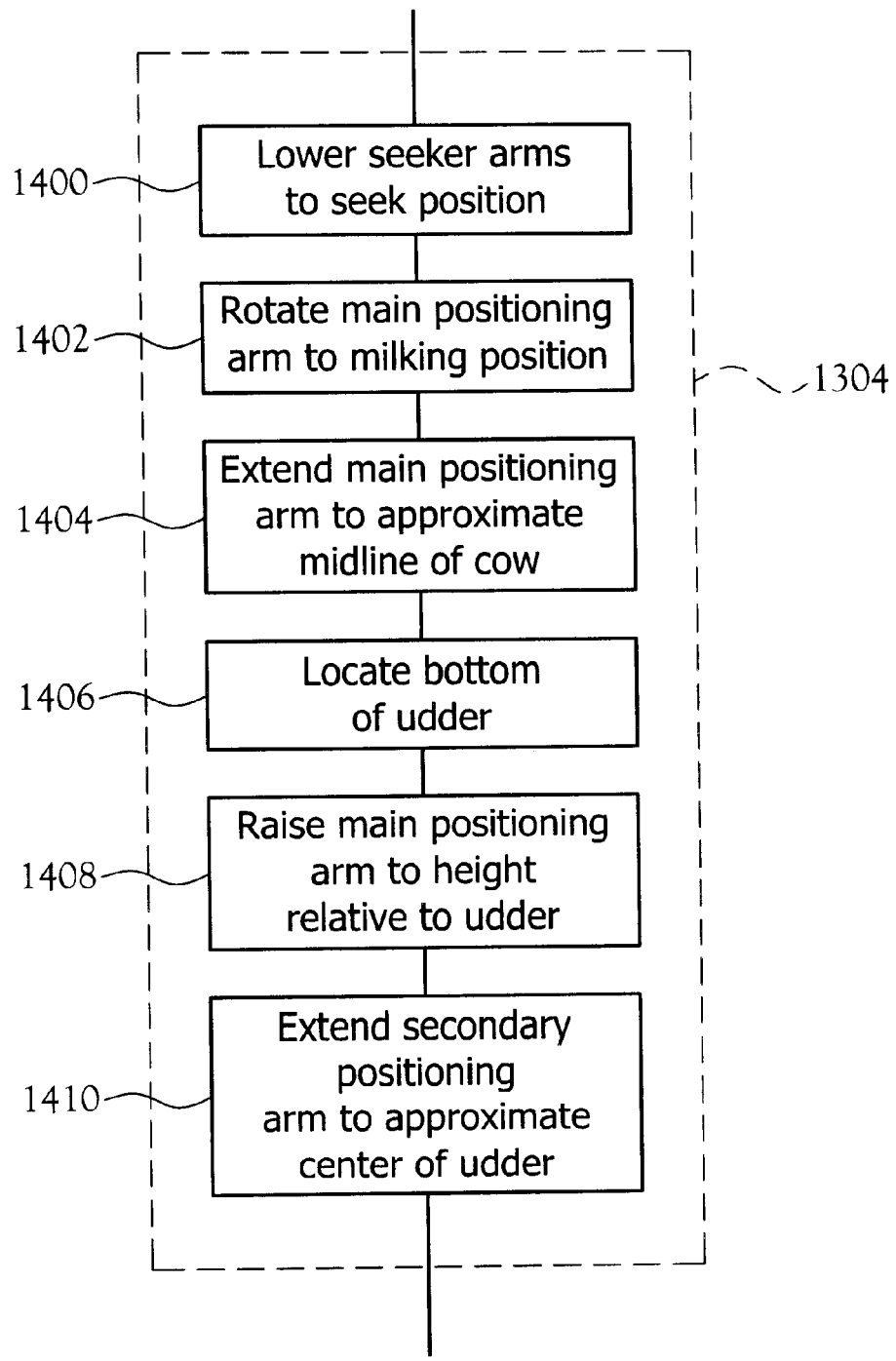
FIG. 14 is a flow diagram further detailing the steps involved in moving the milking platform to the milking position.

FIG. 14 diagrams the steps involved in moving the milking platform 204 form the home position 400 to the milking position in greater detail. In one embodiment, the wash cycle requires that the teat cups be placed in the raised position during washing. In this instance the teat cups may remain in the raised position until the start of the next milking cycle. Prior to positioning the milking platform 204 in the milking position 500, the teat cups are lowered to the home position, shown in block 1400. The main positioning arm 202 is rotated about the Z-axis until it is substantially perpendicular to the stall 102, which should also be orthogonal to the dairy cow 104, shown in block 1402. The main positioning arm 202 is extended to the approximate center point of the stall 102, shown in block 1404, which results in the milking platform 204 being generally centrally located under the dairy cow 104. A sensor 606 on the milking platform 204 looks for the bottom of the udder while the main positioning arm 202 is raised, shown in block 1406. When the bottom of the udder is located, the height of the milking platform 204 is set at a known distance below the udder, shown in block 1408. The secondary positioning arm 316 is moved to a predetermined position being generally located proximate to the udder, shown in block 1410.

Figure 15:
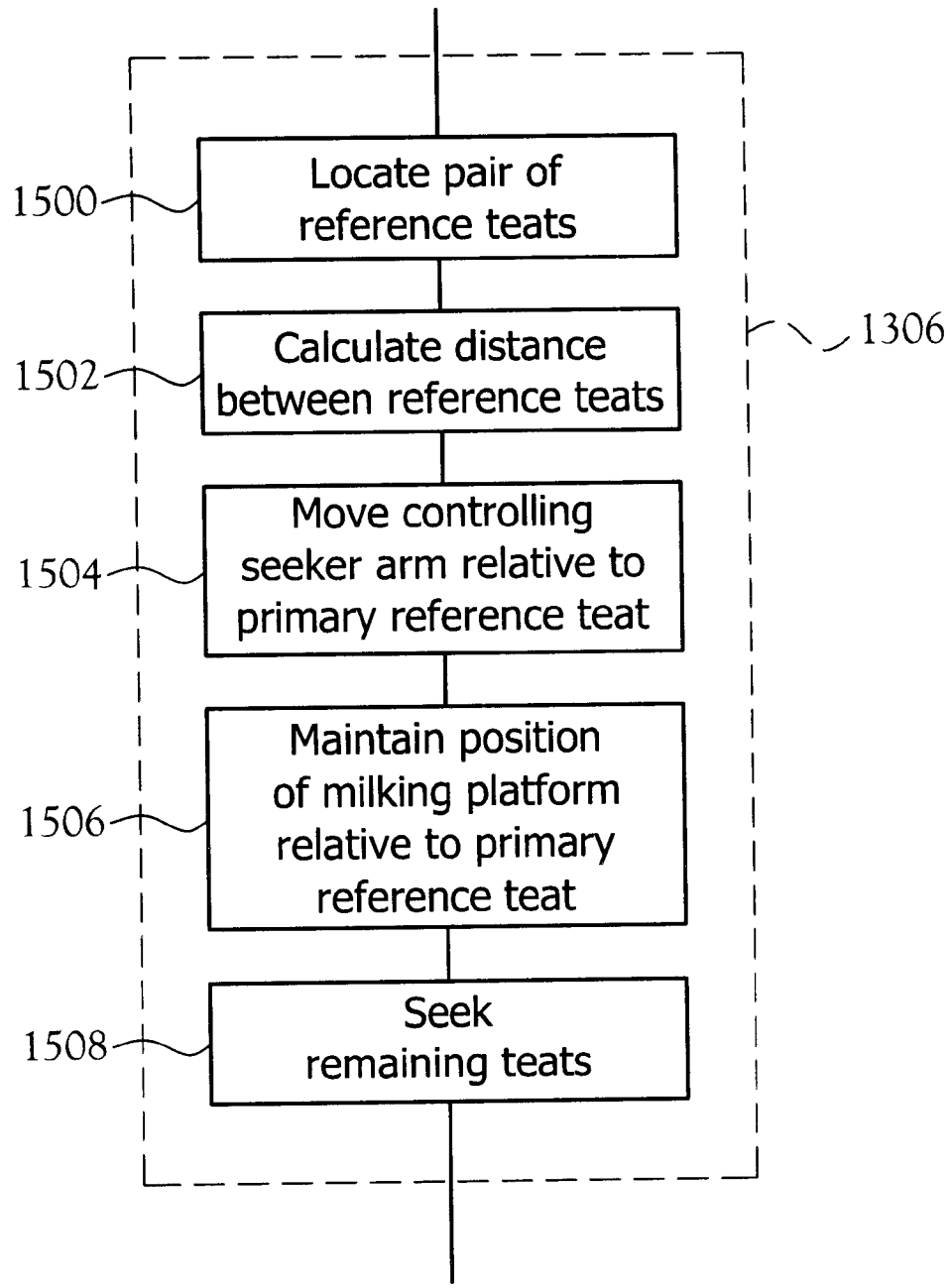
FIG. 15 is a flow diagram further detailing the steps involved in locating the individual teats of the dairy cow.

FIG. 15 diagrams the steps involved locating the individual teats of the dairy cow 104 in greater detail. The y-axis positions of a selected pair of teats, the reference teats, are identified, shown in block 1500. In one embodiment, the front teats are used as the reference teats with the front, right teat being the primary reference teat and the front, left teat being the secondary reference teat. The primary reference teat position on the y-axis is generally located by the controlling seeker arm 600*a*. The secondary seeker arm 600*d* scans and generally locates the position of the secondary reference teat on the y-axis. Using the position information, the distance between the reference teats is calculated, shown in block 1502. The distance is divided by two and the controlling seeker arm carriage 604*a* is moved to a corresponding position on the track member 602*a*, shown in block 1504. The milking platform 204 is moved by adjusting the main positioning arm 202 and the secondary positioning arm 316 until the primary reference teat has been reacquired by the controlling seeker arm 600*a*, shown in block 1506. The relative position of the milking platform 204 is maintained during the milking operation to accommodate for movement or shifting by the dairy cow 104. The remaining teats are simultaneously located by the secondary seeker arms 600b–d, shown in block 1508. The position of the secondary seeker arms 600b–d is adjusted using the corresponding carriages 604b–d and longitudinal positioners 608b–d.

Figure 16:
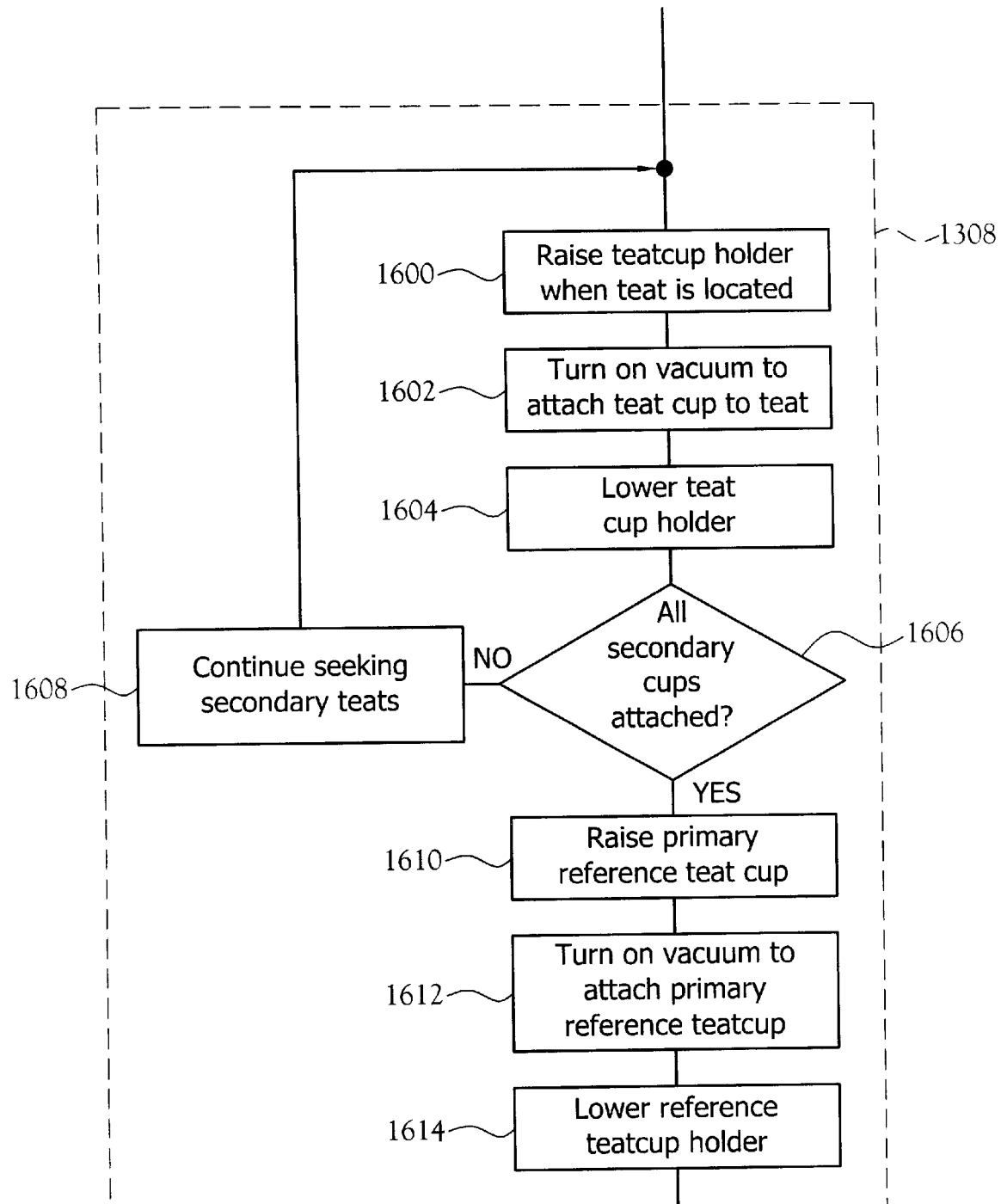
FIG. 16 is a flow diagram further detailing the steps involved in attaching the teatcups to the individual teats of the dairy cow.

FIG. 16 diagrams the steps involved in attaching teatcups to the individual teats of the dairy cow 104 in greater detail. When the position of a teat has been identified by a secondary seeker arm 600b–d and the secondary seeker arm 600b–d is properly positioned beneath the teat, the teatcup platform 610b–d is raised using the teatcup elevator 904, shown in block 1600. The pinch-off valve is opened to turn on suction in the raised teatcup and secure it to the teat, shown in block 1602. The teatcup platform 610b–d then lowers back to the reference position during milking, shown in block 1604. These steps occur for each secondary seeker arm 600b–d independently of the others. The process continues until the teatcups have been attached to all secondary teats, shown in blocks 1606, 1608. Once the secondary teatcups have been attached, the teatcup associated with the controlling seeker arm attaches. By virtue of the reference status, the position of the primary reference teat is known and the teatcup platform 610a is properly positioned beneath the teat, so the teatcup platform 610a is raised using the teatcup elevator 904, shown in block 1610. The pinch-off valve is opened to turn on suction in the raised teatcup and secure it to the teat, shown in block 1612. The teatcup platform 610a then lowers back to the reference position during milking, shown in block 1614.

Figure 17:
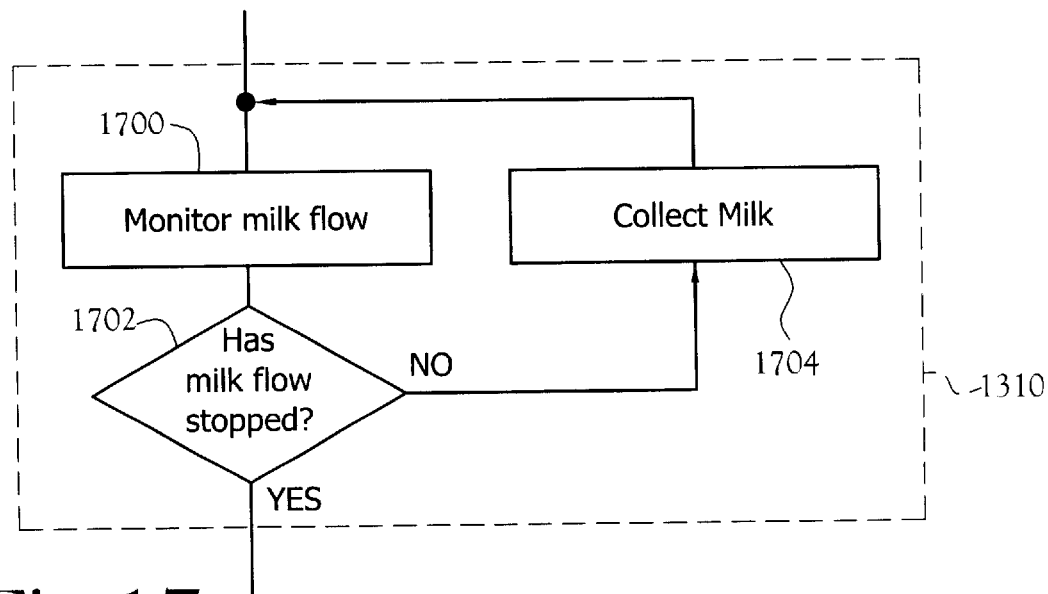
FIG. 17 is a flow diagram further detailing the steps involved in collecting the milk from the diary cow.

FIG. 17 diagrams the steps for collecting milk in greater detail. The flow of the milk from the individual teats is detected by a flow switch associated with each teatcup 900a–d, shown in block 1700. While the flow switch indicates that milk is still being collected from the teat, milk collection continues, shown in blocks 1702, 1704.

Figure 18:
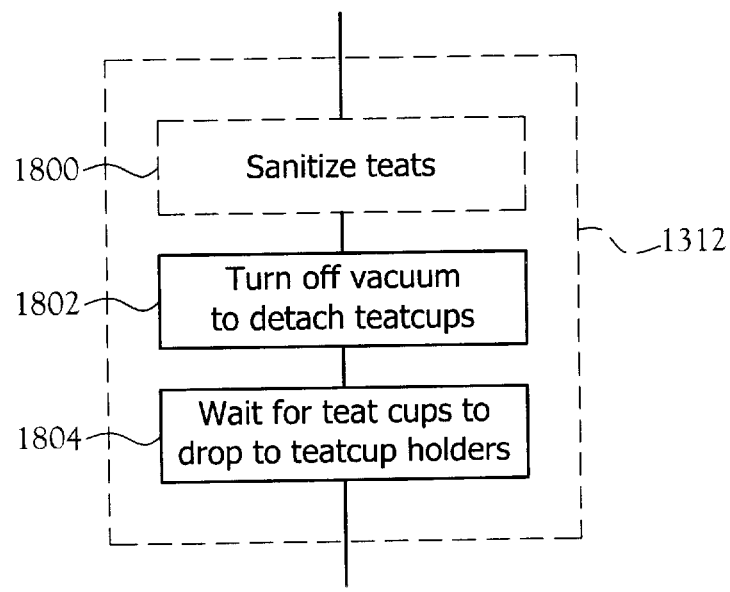
FIG. 18 is a flow diagram further detailing the steps involved in removing the teatcups from the dairy cow.

FIG. 18 diagrams the steps involved in detaching the teatcups from the individual teats of the dairy cow 104 in greater detail. Once the associated flow switch indicates that the flow of milk has stopped from an individual teat, the teatcup is removed. In one embodiment, the process includes a sanitization step wherein a teat is coated with sanitizer prior to or during the removal of the teatcup. The sanitization step can be accomplished by closing of the milk collection ports and backfilling the teatcup with sanitizer prior to removal or by applying sanitizer, such as by a spray ring, as the teatcup is removed, shown in block 1800. To remove the teatcup, the pinch off valve is closed to relieve the vacuum pressure inside the teatcup, shown in block 1802. Removal of the vacuum pressure allows the teatcup to drop back into the opening in the teatcup platform 610a–d. Once all teatcups have dropped, the removal process is complete, shown in block 1804.

Figure 19:
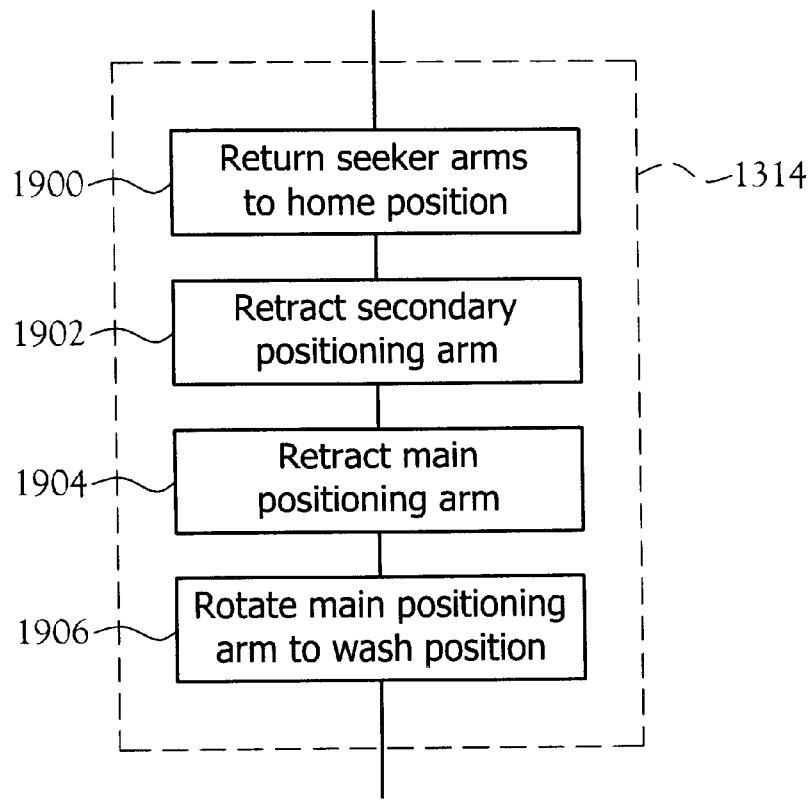
FIG. 19 is a flow diagram further detailing the steps involved in moving the milking platform to the wash/home position.

FIG. 19 diagrams the steps involved in returning the milking platform 204 to the home/wash position 400 in greater detail. Generally, the steps are the reverse of the steps used to place the milking platform 204 in the milking position 500. The seeker arms 600a–d are returned to the home position, shown in block 1900. The secondary positioning arm 316 retracts, shown in block 1902. The main positioning arm 202 retracts to bring the milking platform 204 back out from under the dairy cow 104. The rotary actuator 302 rotates the main positioning arm 202 back to the home/wash position 400, shown in block 1906.

Figure 20:
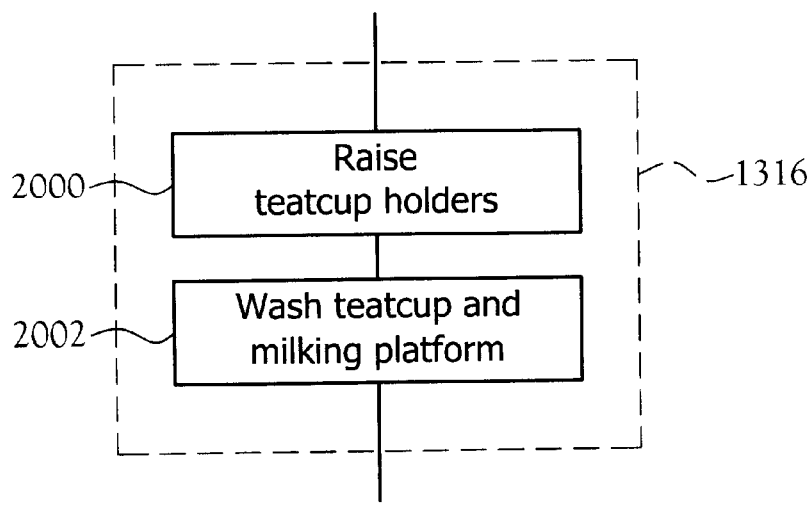
FIG. 20 is a flow diagram further detailing the steps involved in washing the milking platform after the milking operation.

FIG. 20 diagrams the steps involved in washing/sanitizing the milking platform 204 in greater detail. In one embodiment, the teatcup platforms are raised to engage a four port sprayer configured similarly to the teats of a cow, shown in block 2000. Generally, the milking platform and, in particular, the teatcups are cleaned and sanitized, as shown in block 2002, to prevent the spread of infection between dairy cows 104 and to ensure that the milk collected remains safe for human consumption.

Those skilled in the art will recognize that the method described herein includes the steps generally required to implement live capture of the teats for automated milking. Certain steps can be performed in any order or simultaneously with other steps and non-essential steps can be added or omitted without departing from the scope and spirit of the present invention.

The live capture milking apparatus 10 of the present invention is intended to be used as part of a comprehensive milking procedure. Proper pre-milking udder/teats. Proper post-milking procedure includes sanitization of the teats and sanitization/washing of the milking platform 204.

Bacteria responsible for mastitis infections can be minimized by proper milking technique, maintaining a clean and dry environment for the dairy cows, and proper cleaning and maintenance of the live capture milking system. It is desirable for the udder region of the dairy cow to be washed using a disinfectant prior to milking. After milking, the likelihood of infection can be reduced by a dipping of the teats in a sanitizing solution. The present invention is directed to the actual milking process and is not intended to perform a preparatory wash. Pre-washes are known to those skilled in the art and can be satisfactorily performed at a separate station prior to milking. However, the present invention is optionally equipped with a sanitization system that includes a shower ring carried with the teatcup.

Following the milking operation, a shower ring sprays a sanitizing solution, such as an iodine solution, onto the teat. The solution coats the teat and tends to block the teat opening. This reduces the chance of infection resulting from bacteria being able to enter the teat when the dairy cow comes in contact with unsanitary conditions.

A post-milking wash of the milking platform reduces the instances of infection in dairy cows, as well as to comply with Food and Drug Administration regulations concerning the maximum allowable bacteria count for equipment intended for collecting milk for human consumption. Post-milking equipment washes are known to those skilled in the art. One procedure for a milking equipment wash involves pasteurization of teatcup clusters with hot water at a given temperature for a given duration, e.g., 185° water for 5 seconds.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, I claim:

1. An apparatus for milking a dairy cow, said apparatus comprising:
   a controller;
   a main support capable of longitudinal extension;
   a main positioning arm capable of longitudinal extension, said main positioning arm responsive to said controller;
   a rotary actuator responsive to said controller, said rotary actuator capable of rotary movement, said rotary actuator connecting said main positioning arm to said main support;

a secondary positioning arm capable of longitudinal extension, said secondary positioning arm being orthogonally connected to said main positioning arm, said secondary positioning arm responsive to said controller;

a milking platform secured to said secondary positioning arm; and a plurality of seeker arms, each of said plurality of seeker arms including:
      a lateral positioner carried by said milking platform, said lateral positioner responsive to said controller;
      a longitudinal positioner carried by said milking platform, said longitudinal positioner responsive to said controller;
      an elevator carried by said milking platform, said elevator responsive to said controller;
      at least one lateral sensor associated with said lateral positioner for detecting a teat of the dairy cow;
      at least one longitudinal sensor associated with said longitudinal positioner for detecting a teat of the dairy cow; and
      a milk collection unit carried by said seeker arm;
   wherein said controller guides each of said plurality of seeker arms based upon feedback from said at least one lateral sensor and said at least on longitudinal sensor such that said milk collection unit is attached to a teat of the dairy cow.

2. The apparatus for milking of a dairy cow of claim 1 further comprising a distance sensor carried by said milking platform, said distance sensor in communication with said controller wherein said controller moves said milking platform to maintain a fixed distance between said milking platform and the teats of the dairy cow.

3. An apparatus for milking a dairy cow, said apparatus comprising:
   a controller;
   a milking platform;
   a plurality of milk collection units;
   a major positioning system responsive to said controller, said major positioning system moving said milking platform in three dimensions and rotating said milking platform about a fixed point;
   a plurality of sensors carried by said milking platform, said plurality of sensors in communication with said controller, said plurality of sensors adapted to identify a teat of the dairy cow; and
   a plurality of minor positioning systems responsive to said controller, each of said minor positioning systems being carried by said milking platform, each of said minor positioning systems moving a corresponding one of said plurality of milk collection units in three dimensions and attaching said corresponding one of said plurality of milk collection units to a teat of the dairy cow identified by said plurality of sensors.

* * * * *